United States Patent Office 3,131,580
Patented May 5, 1964

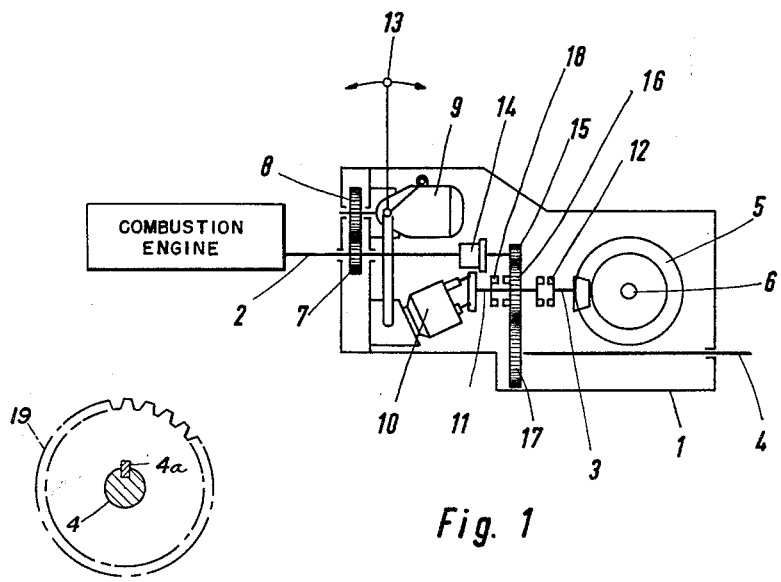
Fig. 1
Fig. 3
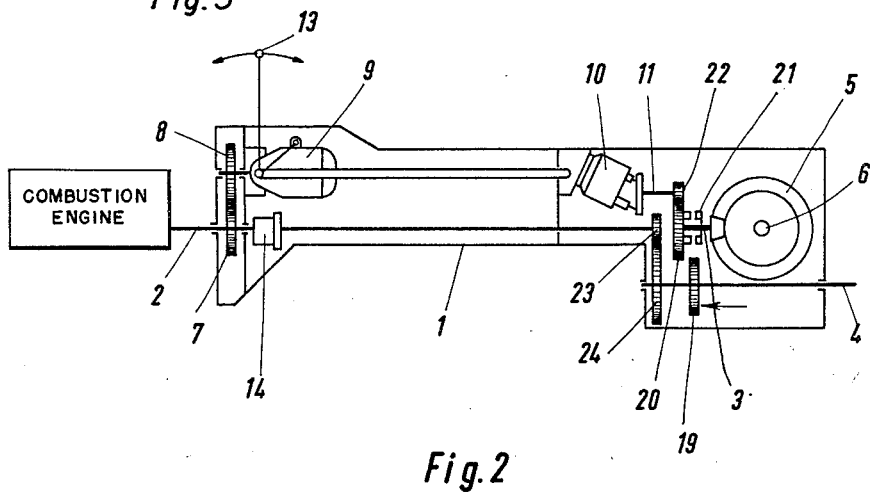
Fig. 2

3,131,580
TRANSMISSION WITH TWO SECONDARY
DRIVE SHAFTS
Franz Forster, Glattbach, near Aschaffenburg, Germany, assignor to Gesellschaft für Linde's Eismaschinen Aktiengesellschaft, Hollriegelskreuth, near Munich, Germany, a company of Germany
Filed Oct. 3, 1960, Ser. No. 76,430
Claims priority, application Germany Oct. 9, 1959
5 Claims. (Cl. 74—720)

This invention1 relates to self-propelled wheeled vehicles, and is particularly concerned with improvements in the drive mechanism by which power is delivered to driven wheels of such vehicles.

There have been known gear units, e.g. for tractors, which include an actuating shaft and two driven shafts which can be clutched, if necessary, wherein the number of revolutions of the first of the driven shafts is preferably adjustable in both directions and infinitely variable from zero up to a maximum value proportional to the number of revolutions of the actuating shaft, and the number of revolutions of the second driven shaft is either in fixed relation to the number of revolutions of the actuating shaft or to that of the first mentioned driven shaft. For example, in a tractor, the actuating shaft customarily is driven by a combustion engine and the one driven shaft actuates the driving wheels through cogwheel gears and differential gears, while the other driven shaft serves as power takeoff.

According to the type of driving and the attainable characteristic data, there are known three different construction types of power takeoff shafts:

(1) The motor power takeoff shaft; this runs at a constant speed relation to the driving engine. Thereby it is endeavored to bring the tractor to speed with power takeoff shaft which was already brought to full normal speed, and to maintain such speed even temporarily.

(2) The gear power takeoff shaft; this also runs at a constant speed relation with respect to the combustion engine, but it starts to run only when the tractor has been brought to speed and remains idle after disengagement of the clutch.

(3) The traveling power takeoff shaft; its number of revolutions is in a constant ratio to that of the driving sprockets.

The power takeoff shafts usually used in tractor construction are either motor power takeoff shafts or gear power takeoff shafts which can be shifted to the function of a traveling power takeoff shaft if necessary.

According to the present invention, the aforedescribed gearing is characterized in that the number of revolutions of the second driven shaft can be regulated preferably in both directions and infinitely variably from zero up to a maximum value proportional to the number of revolutions of the actuating shaft. Thus, as explained herein below, the applicability of such a gear means can be essentially expanded at minimum construction costs. The structural make-up of the gear unit can be characterized by an actuating shaft which can be clutched with a combustion engine, a mechanical-hydraulic energy converter viz., a hydrostatic regulating pump, driven by said actuating shaft, preferably by means of a reducing gear, said converter transmitting its deliverable power preferably in both directions to an infinitely variable hydrostatic motor which actuates a first driven shaft through a transmission gear, if necessary; a second driven shaft which can be actuated by means of transmission, and in some cases by the actuating shaft through a releasable clutch, or by the first mentioned driven shaft through a releasable clutch and by the hydrostatic motor through a releasable clutch. Here it is, in particular, advantageous if at least one energy converter is constructed in the form of an axial piston.

The invention will now be described in greater detail and with reference to the accompanying drawing in which FIG. 1 is a schematic representation of a gear unit in accordance with the invention;

FIG. 2 is a schematic representation of a modified form of the gear unit shown in FIG. 1 and FIG. 3 is a diagrammatic representation, on an enlarged scale, of the mode of mounting cogwheel 19 on driven shaft 4 of FIG. 2. In these figures, which show schematically two construction examples of the invented gear unit, the same or corresponding parts are designated with the same reference numerals.

FIGURE 1 shows a case 1 wherein are disposed an actuating shaft 2 and two driven shafts 3 and 4, and the driven shaft 3 actuates an axial shaft 6 through a conical wheel gear or differential gear 5. The drive leads from a combustion engine by way of the actuating shaft 2 through cooperating cogwheels 7 and 8 to a hydrostatic regulating pump 9 which transfers its hydraulic energy to a motor 10. The motor 10 drives a shaft 11 and this in its turn drives the driven shaft 3—by way of an engaged clutch 12—and thus the axial shaft 6. The number of revolutions and the driving direction of the motor 10 are determined by the delivery and this latter is dependent on the position of a lever 13. Lever 13 is adjustable in both directions in an infinitely variable way from zero to a maximum value. Besides, the actuating staft 2 drives a cogwheel 15 through a clutch 14 which is preferably of the disc type which cogwheel 15 mates with a cogwheel 17 fixed on the driven shaft 4. With clutch 14 engaged, the driven shaft 4 in the fixed relation of the cogwheels 15, 17 is thus moved by the actuating shaft 2. Hence the driven shaft 4 shows the properties of a "motor power takeoff shaft". The cogwheel 16 running on the shaft 11 can be coupled with the shaft 11 by means of a clutch 18. If there is effected a drive by the motor 10 through the shaft 11 and the clutch 12 to the driven shaft 3, and if the clutch 18 is engaged, whereby the clutch 14 is, of course, released, then the driven shaft 4 has a number of rotations corresponding to the driven shaft 3. The ratio of the number of revolutions is constant and determined by the size of the cogwheels 16 and 17. Thus, the function of a "traveling power takeoff shaft" is fulfilled. When clutch 12 is released, and the clutch 18 engaged, the driven shaft 4 is driven through the shaft 11, the clutch 18, the cogwheel 16 and the cogwheel 17. Hence, there is given the invented possibility of regulating the number of revolutions of the driven shaft 4 in both directions, infinitely variably from zero to a maximum value.

FIGURES 2 and 3 show a similar device, wherein instead of the clutch 18 there is provided a cogwheel 19, arranged in a non-rotatably and axially slidably way on the driven shaft 4, being loosely keyed on said shaft 4 by means of a key 4a as shown in FIG. 3, which cogwheel 19 can be shifted, in the direction of the arrow shown in FIG. 2, to become engaged with the cogwheel 20 for the invented gear-shift possibilities of the driven shaft 4, and the clutch 21 is released. In this case the driven shaft 3 is actuated by motor 10 through a cogwheel-transmission 22, 20. The driven shaft 4 rotates as "traveling power takeoff shaft" when the cogwheels 19 and 20 are engaged and the clutch 21 is connected, and it rotates as "motor power takeoff shaft" when the drive is performed by the actuating shaft 2 through the clutch 14 and the cogwheels 23 and 24 and disconnected cogwheel 19.

By an application of the invented device which does not require any perceptible additional cost for the construction, it is feasible to utilize the advantages of the hydrostatic energy transmission to the transportation driving during the stoppage of the vehicle even for the pilot shaft, which e.g. is greatly advantageous for the drive of winches, pumps etc. In this and other machines there appears not only a gain in capacity, but, under circumstances, even further gearing steps can be eliminated.

I claim:

1. Transmission device for a vehicle, said device comprising
   an actuating shaft unit (2) driven by an internal combustion engine;
   a disconnectable clutch member (14) integrated in said actuating shaft unit (2) intermediate the ends of the latter;
   a first gear (7) fixed to said actuating shaft unit (2) between said engine and said disconnectable clutch member (14);
   a second gear (15 or 23) arranged at that end of said actuating shaft unit (2) which is remote from said engine;
   a hydrostatic pump (9) having a driving means including a toothed driving gear (8) which meshes with said first gear (7);
   a hydrostatic motor (10);
   a conduit connecting said hydrostatic pump with said hydrostatic motor whereby the hydrostatic pump loads the hydrostatic motor;
   said transmission device comprising also a secondary drive shaft (3) provided for the drive of the vehicle and a power takeoff shaft (4),
   said hydrostatic motor (10) being connectable with said secondary drive shaft (3) for the vehicle drive and being further connectable, through gear means, with said power takeoff shaft (4), whereby said second gear (15, or 23) meshes with an additional gear (16, or 24) which is connected with the power takeoff shaft (4) and is selectively connectable with the secondary drive shaft (3) for the vehicle drive to make possible a mechanical connection from the drive shaft (2) to the vehicle drive and the power takeoff shaft (4) or to the power takeoff shaft (4) only.

2. Transmission device as defined in claim 1, in which said hydrostatic motor (10) is connectable with said secondary drive shaft (3) by means of a motor-driven shaft (11) which carries said additional gear (16) and which is provided with two clutches one clutch (18) of which is intermediate the shaft (11), which is connected to the hydrostatic motor (10), and said additional gear (16) and the other (12) of which clutches is intermediate said shaft (11) and said secondary drive shaft (3).

3. Transmission device as defined in claim 2, in which said hydrostatic motor (10) is connectable with said power takeoff shaft (4) by means of said motor-driven shaft (11) clutch (8), and train of gears (16, 17).

4. Transmission device as defined in claim 1 in which said hydrostatic motor (10) is connectable with said secondary drive shaft (3) by means of a motor-driven shaft (11), a train of gears (22, 20) and a clutch (21).

5. Transmission device as defined in claim 4, in which said hydrostatic motor (10) is connectable with said power takeoff shaft (4) by means of said motor-driven shaft (11), said train of gears (22, 20) and a shiftable cogwheel (19) which is non-rotatably but axially-slidably mounted on said power takeoff shaft (4).

References Cited in the file of this patent

UNITED STATES PATENTS

| | | |
|---|---|---|
| 2,580,946 | Orshansky et al. | Jan. 1, 1952 |
| 2,891,419 | Badalini | Jan. 23, 1959 |
| 2,922,320 | Hutter et al. | Jan. 26, 1960 |
| 2,945,382 | Ritter et al. | July 19, 1960 |
| 2,972,907 | Bullard | Feb. 28, 1961 |